(12) United States Patent
Cha et al.

(10) Patent No.: US 12,494,609 B2
(45) Date of Patent: Dec. 9, 2025

(54) BOARD CONNECTION CONNECTOR AND BOARD CONNECTION ASSEMBLY COMPRISING SAME

(71) Applicant: GigaLane Co., Ltd., Hwaseong-si (KR)

(72) Inventors: Sun Hwa Cha, Hwaseong-si (KR); Young Jo Kim, Hwaseong-si (KR); Hwa Yoon Song, Hwaseong-si (KR); Kyung Hun Jung, Hwaseong-si (KR); Hee Seok Jung, Hwaseong-si (KR)

(73) Assignee: GIGALANE CO., LTD., Hwaseong-si (KR)

( * ) Notice: Subject to any disclaimer, the term of this patent is extended or adjusted under 35 U.S.C. 154(b) by 353 days.

(21) Appl. No.: 18/002,493

(22) PCT Filed: Dec. 20, 2021

(86) PCT No.: PCT/KR2021/019396
§ 371 (c)(1),
(2) Date: Dec. 20, 2022

(87) PCT Pub. No.: WO2022/139366
PCT Pub. Date: Jun. 30, 2022

(65) Prior Publication Data
US 2023/0238753 A1    Jul. 27, 2023

(30) Foreign Application Priority Data

Dec. 21, 2020  (KR) .................. 10-2020-0179198
Dec. 13, 2021  (KR) .................. 10-2021-0177923

(51) Int. Cl.
*H01R 24/50*    (2011.01)
*H01R 12/71*    (2011.01)
(Continued)

(52) U.S. Cl.
CPC ........... *H01R 24/50* (2013.01); *H01R 12/714* (2013.01); *H01R 12/716* (2013.01); *H01R 13/502* (2013.01); *H01R 2103/00* (2013.01)

(58) Field of Classification Search
CPC ..... H01R 24/50; H01R 12/714; H01R 12/716
(Continued)

(56) References Cited

U.S. PATENT DOCUMENTS 4,964,805 A    10/1990 Gabany
5,453,025 A     9/1995 Wilson
(Continued)

FOREIGN PATENT DOCUMENTS

CN    104733888 A    6/2015
CN    107834233 A    3/2018
(Continued)

OTHER PUBLICATIONS

International Search Report of PCT/KR2021/019396 dated Mar. 28, 2022.
(Continued)

*Primary Examiner* — Abdullah A Riyami
*Assistant Examiner* — Amara Anderson
(74) *Attorney, Agent, or Firm* — Shih IP Law Group, PLLC.

(57) ABSTRACT

The present invention relates to a board connection assembly being characterized by comprising: a board connection pin for transmitting a signal; a dielectric portion having a first insertion hole into which the board connection pin is inserted; a housing having a trench into which a part of the dielectric portion is inserted and a second insertion hole into which the board connection pin is inserted; and a ground contact portion disposed between the housing and the dielectric portion to contact a ground electrode, wherein the ground contact portion has one side inserted into the trench
(Continued)

so as to contact one surface of the trench, and the other side formed to be grounded with the ground electrode, and the height of the housing is configured to be smaller than the width of the housing.

16 Claims, 15 Drawing Sheets

(51) Int. Cl.
 *H01R 13/502* (2006.01)
 *H01R 103/00* (2006.01)
(58) Field of Classification Search
 USPC .......................................................... 439/78
 See application file for complete search history.

(56) References Cited

U.S. PATENT DOCUMENTS

| | | | |
|---|---|---|---|
| 6,776,668 B1 * | 8/2004 | Scyoc | H01R 24/50 439/700 |
| 9,160,121 B2 | 10/2015 | Wagner | |
| 10,971,846 B2 | 4/2021 | So | |
| 2010/0110056 A1 | 5/2010 | Kim | |
| 2020/0021049 A1 * | 1/2020 | Song | H01R 13/6594 |

FOREIGN PATENT DOCUMENTS

| | | | | |
|---|---|---|---|---|
| CN | 111786199 A | 10/2020 | | |
| JP | H08-236227 A | 9/1996 | | |
| KR | 20-0290954 Y1 | 10/2002 | | |
| KR | 20-0297074 Y1 | 12/2002 | | |
| KR | 20-110011035 A | 2/2011 | | |
| KR | 10-1926503 B1 | 12/2018 | | |
| KR | 10-1974785 B1 | 5/2019 | | |
| KR | 20-190091197 A | 8/2019 | | |
| KR | 102006131 B1 * | 8/2019 | ............. | H01R 12/73 |
| KR | 102006134 B1 * | 8/2019 | ............. | H01R 12/71 |
| KR | 102013690 B1 | 8/2019 | | |
| KR | 10-2019-0140859 A | 12/2019 | | |
| KR | 10-2118829 B1 | 6/2020 | | |
| KR | 10-2163379 B1 | 10/2020 | | |
| KR | 10-2214627 B1 | 2/2021 | | |
| WO | 2019074310 A1 | 4/2019 | | |
| WO | 2022139366 A1 | 6/2022 | | |

OTHER PUBLICATIONS

Chinese Application for CN Application No. 202111176865.X dated Sep. 10, 2025.

* cited by examiner

[FIG. 1]
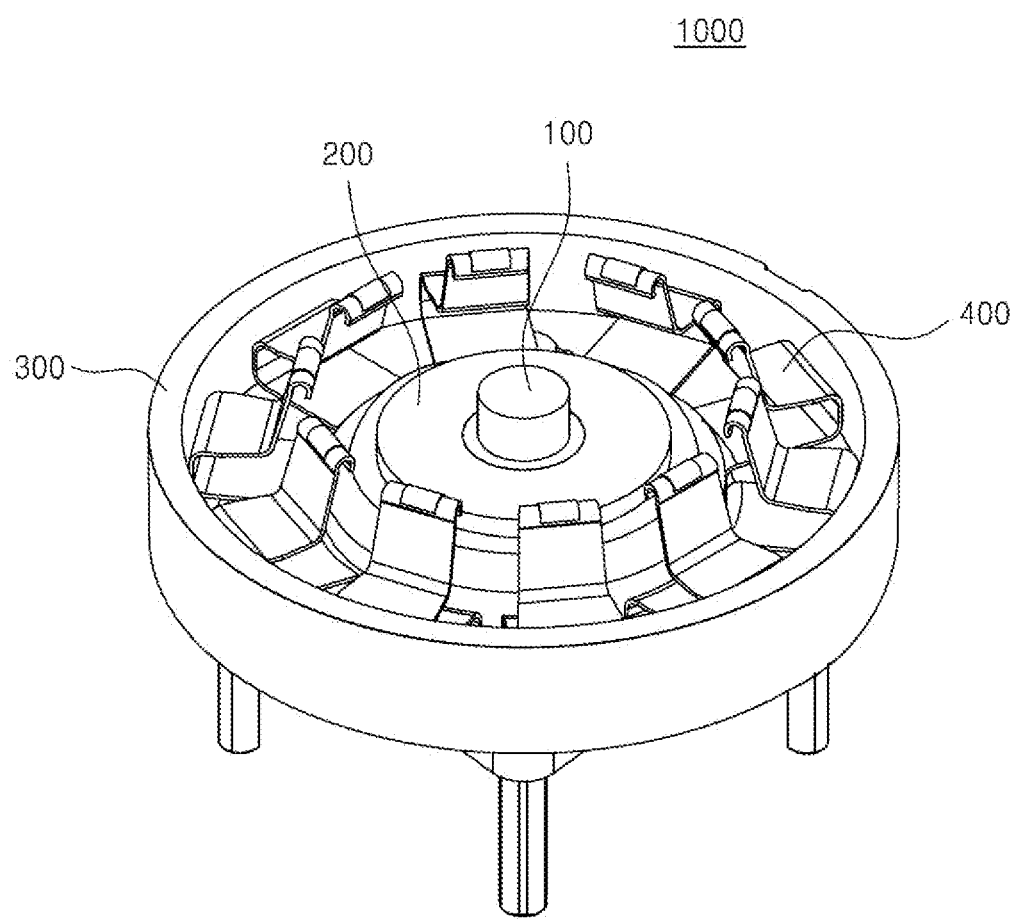

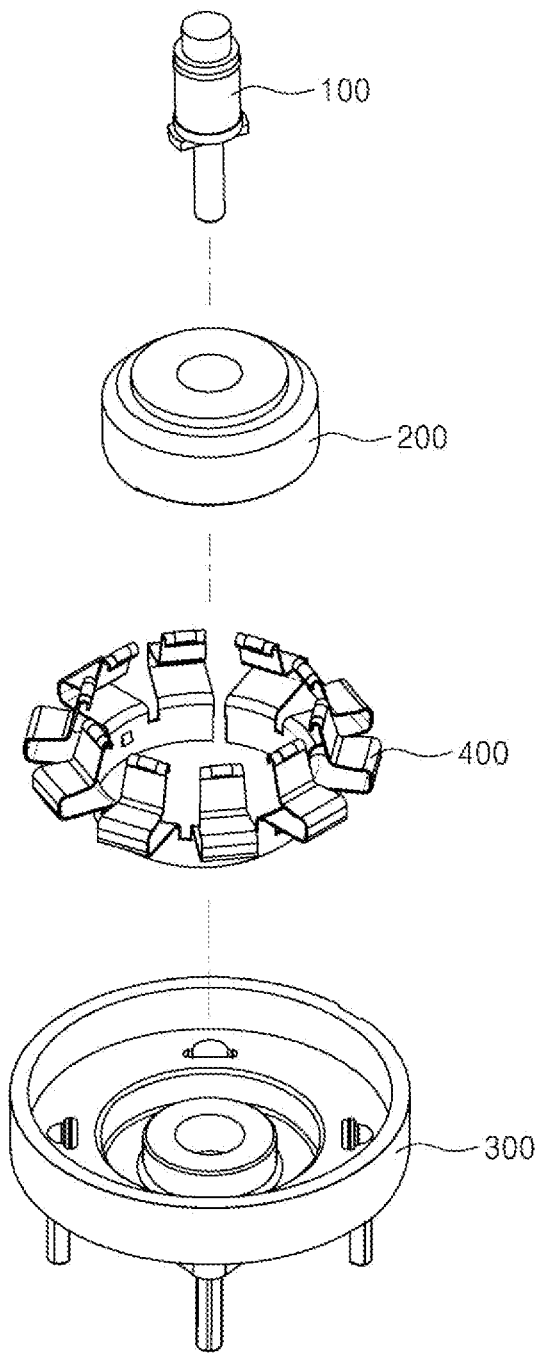
[FIG. 2]

[FIG. 3]
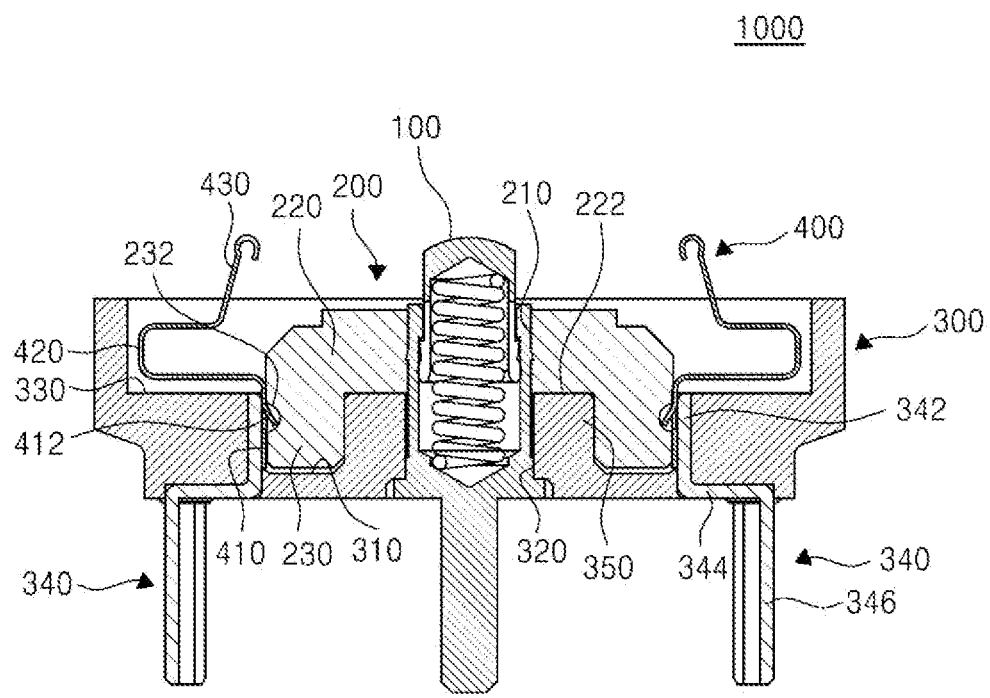

[FIG. 4A]
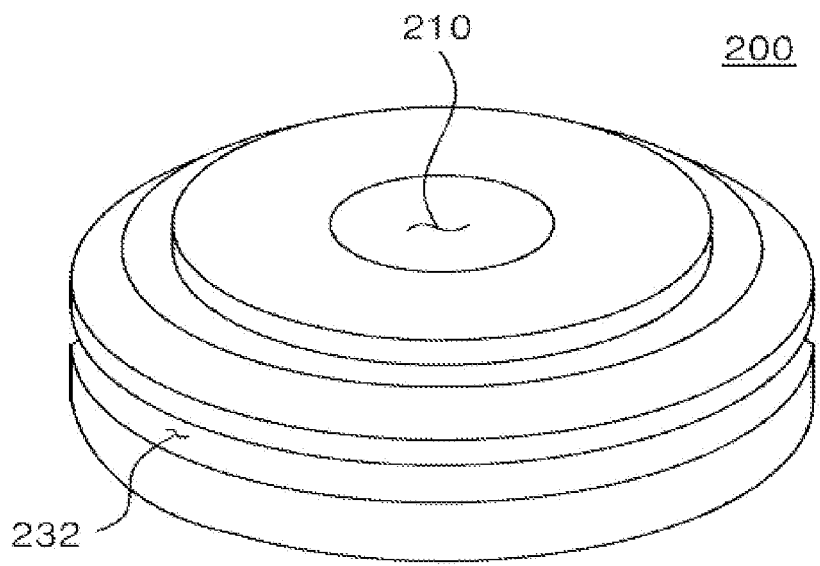
[FIG. 4B]
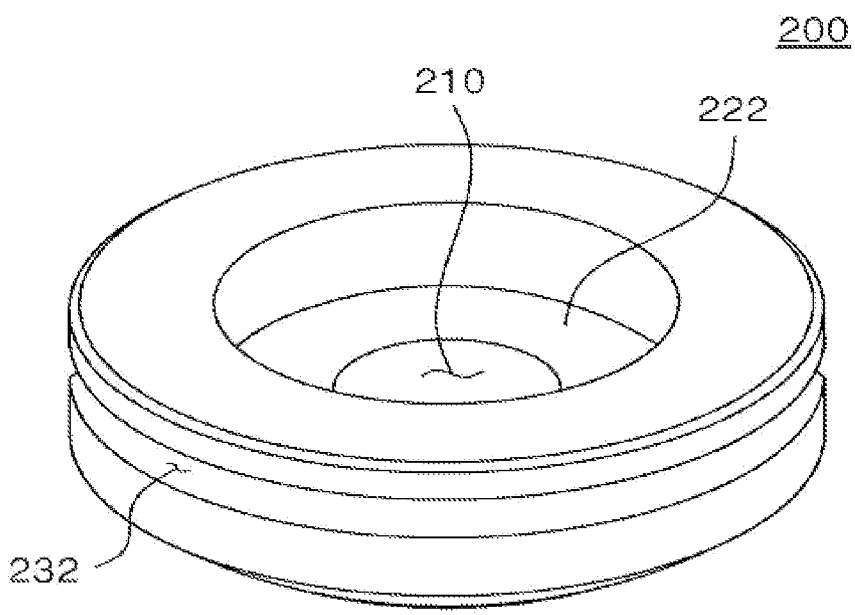

[FIG. 5]
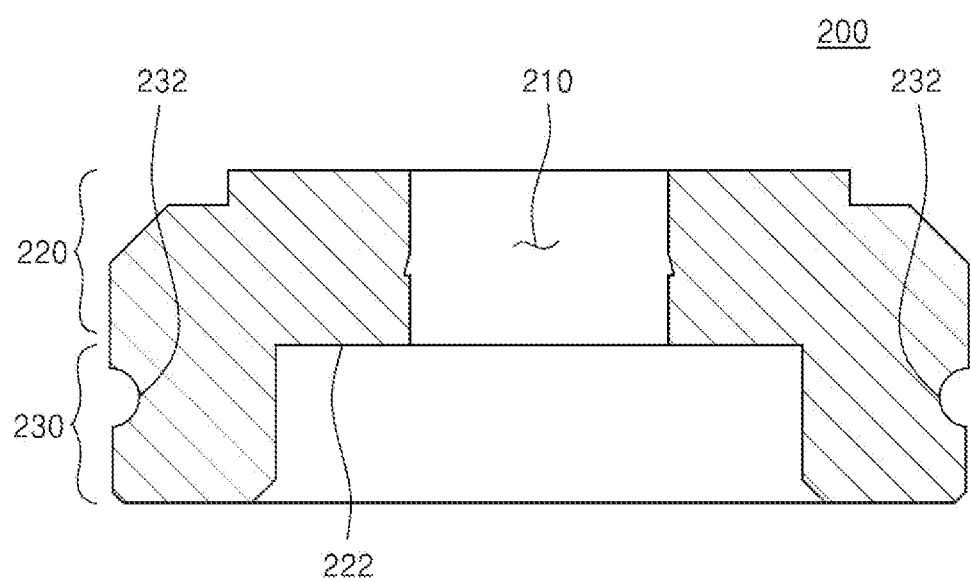

[FIG. 6]
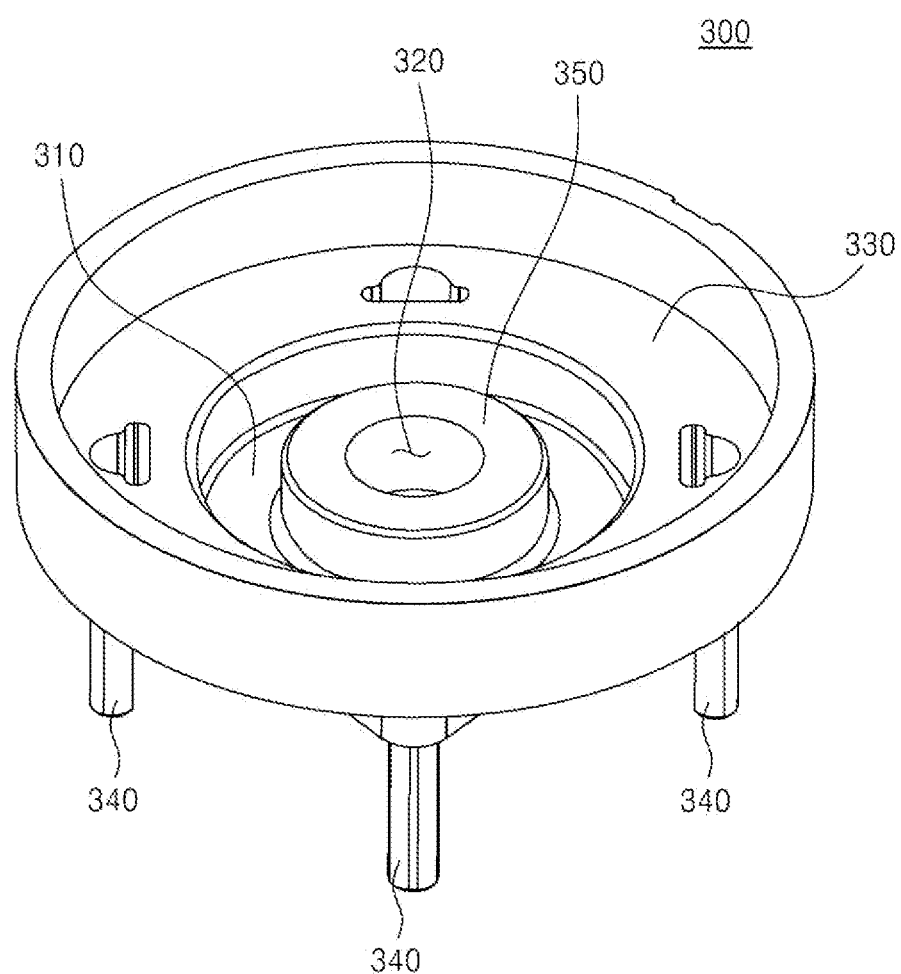

[FIG. 7]
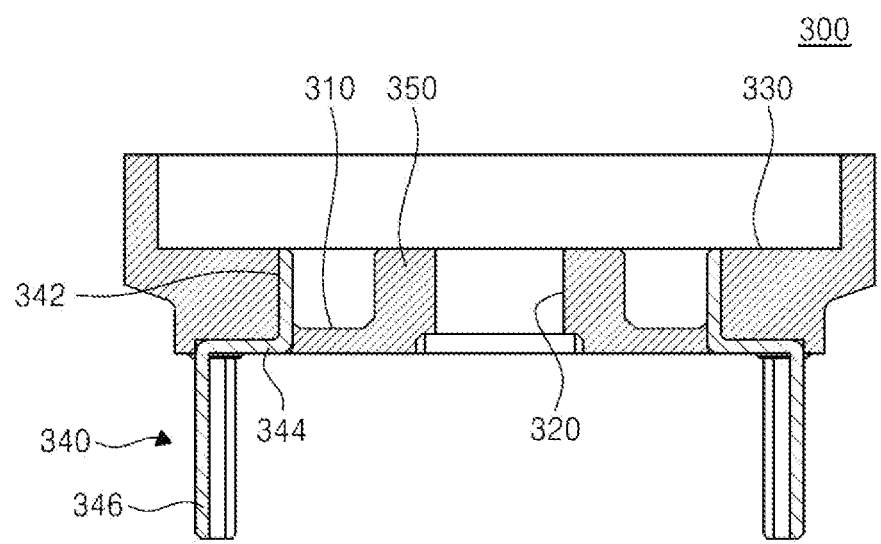

[FIG. 8A]
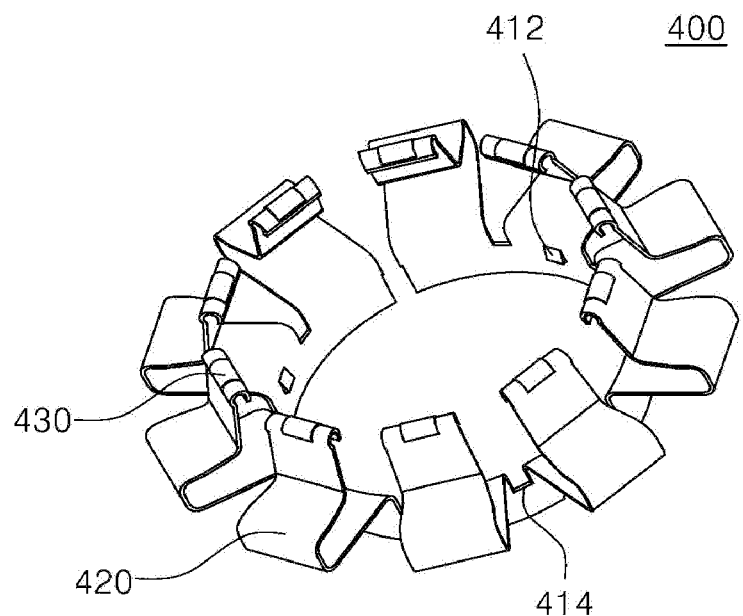
[FIG.8B]
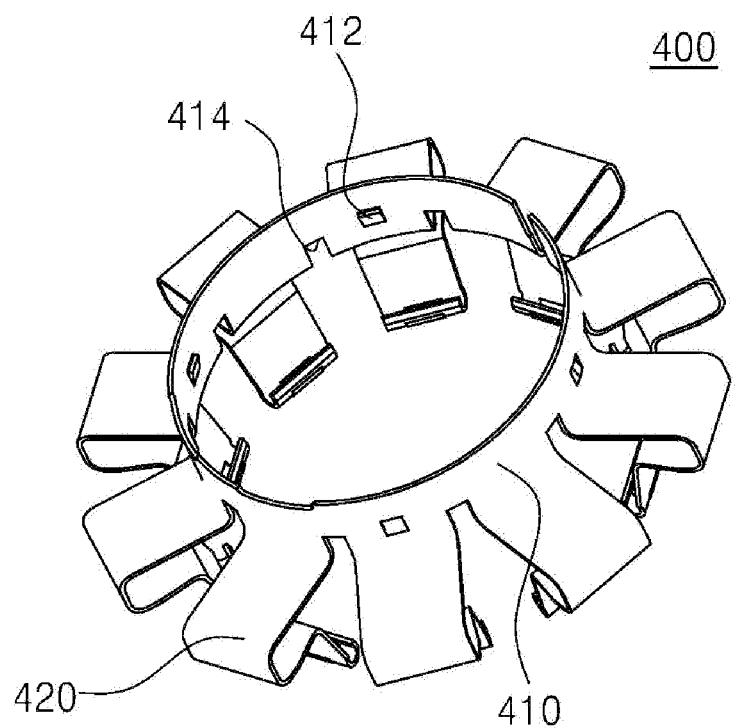

[FIG. 9]
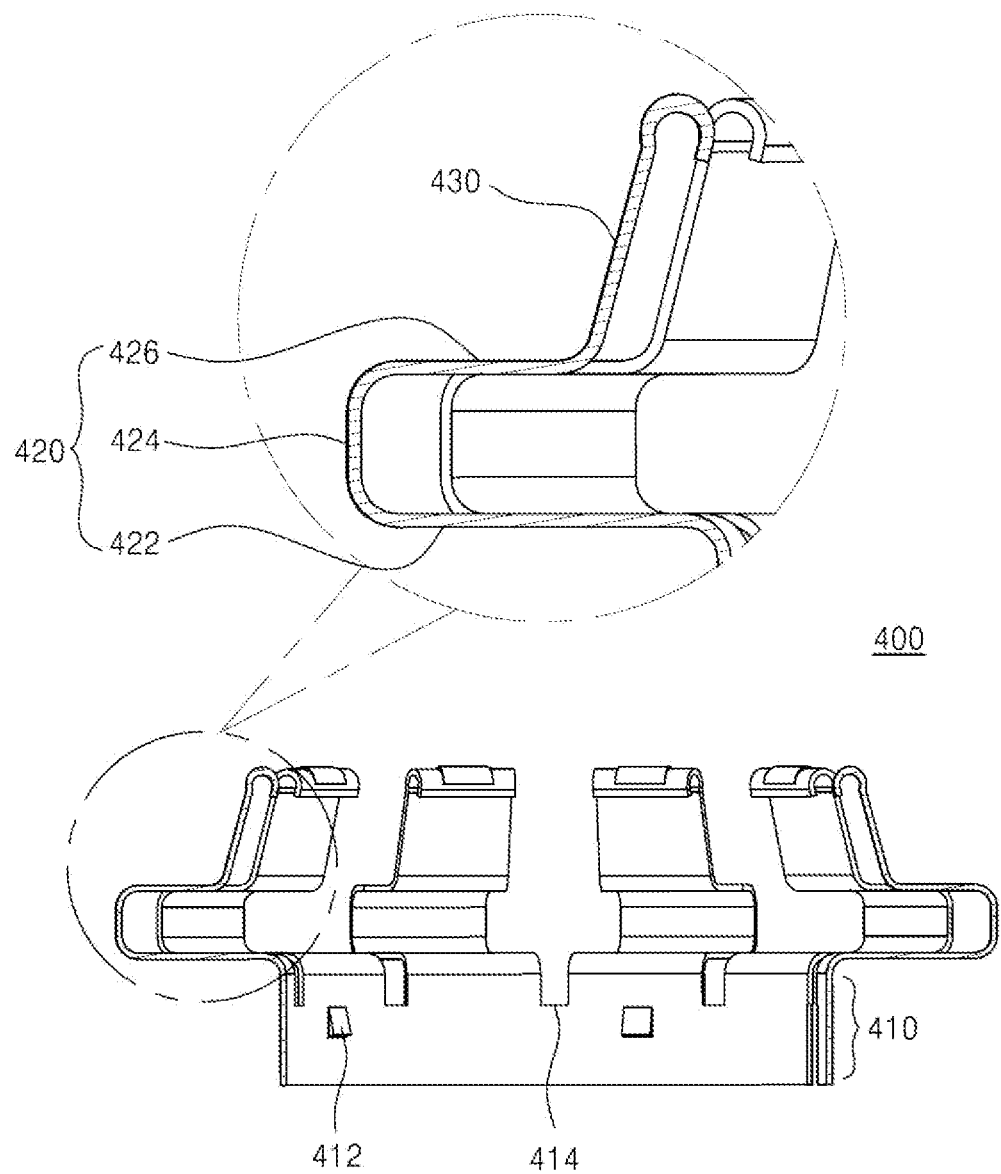

[FIG. 10]
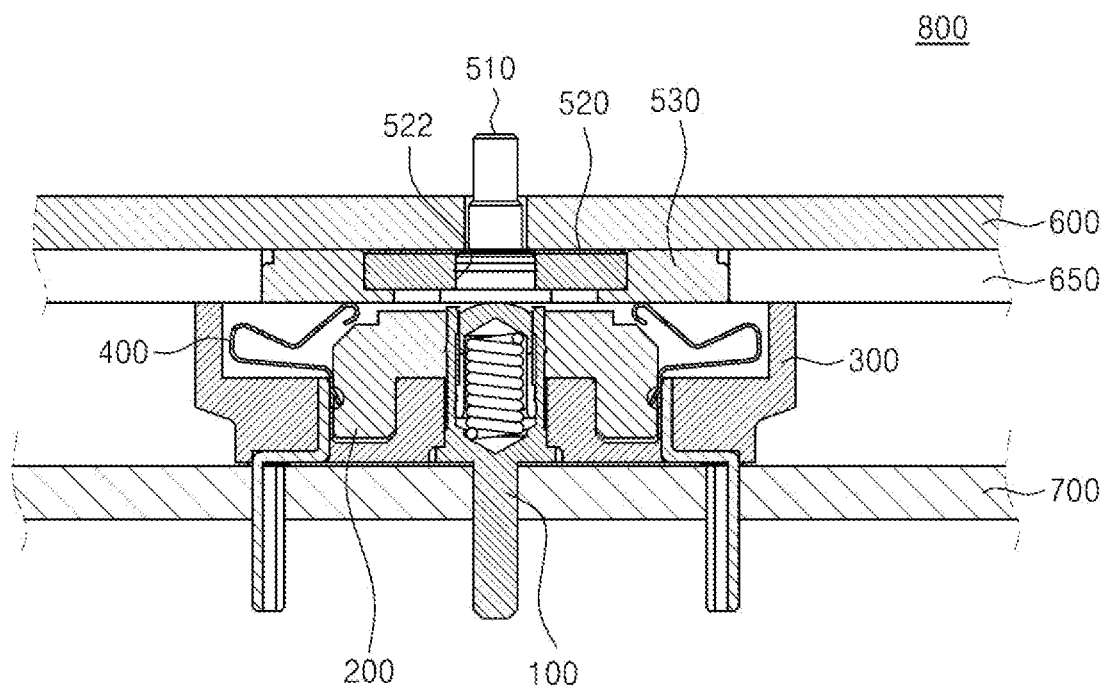

[FIG. 11A]
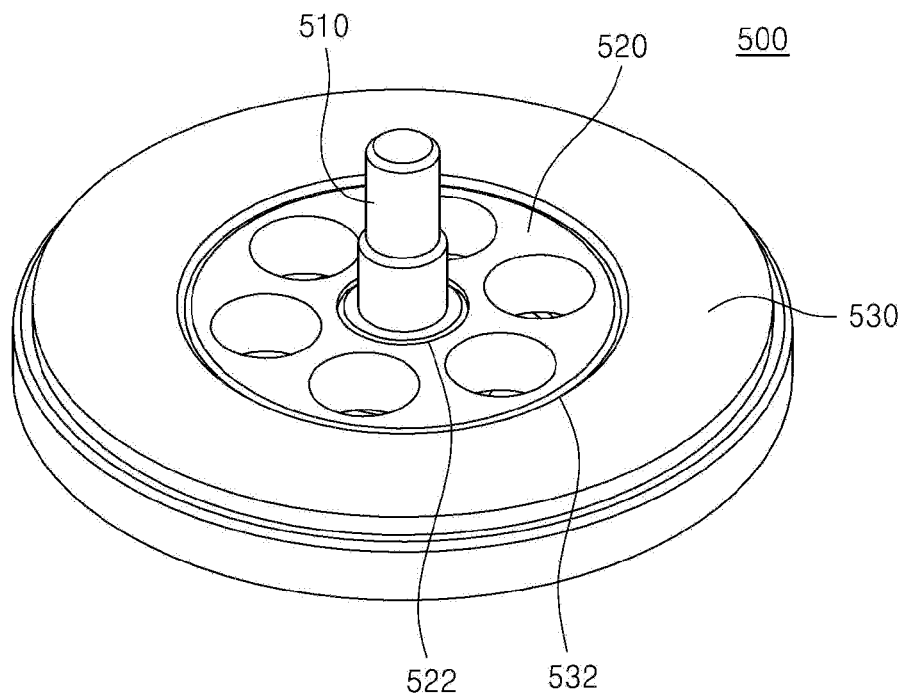
[FIG. 11B]
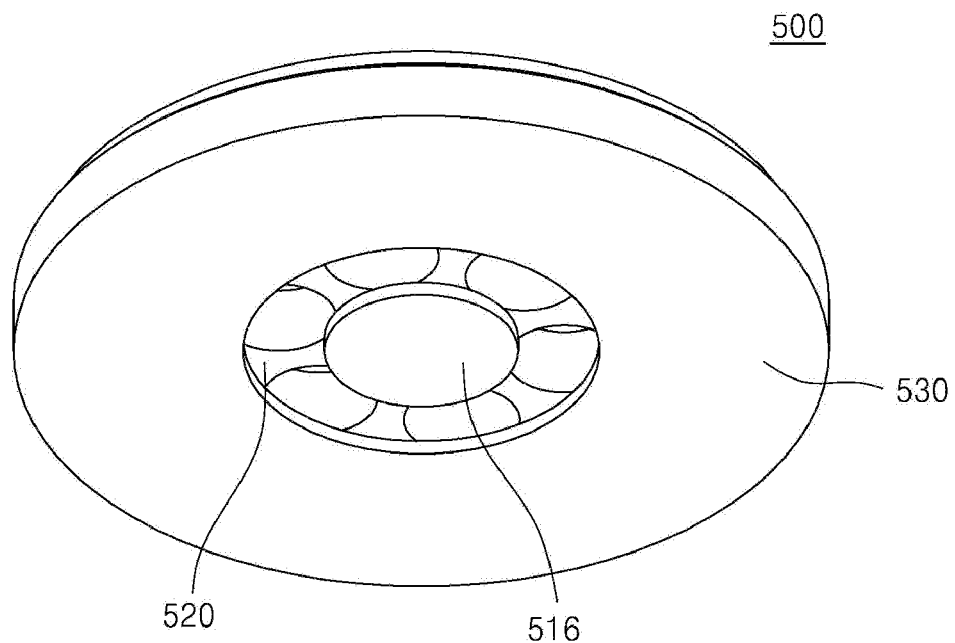

[FIG. 12]
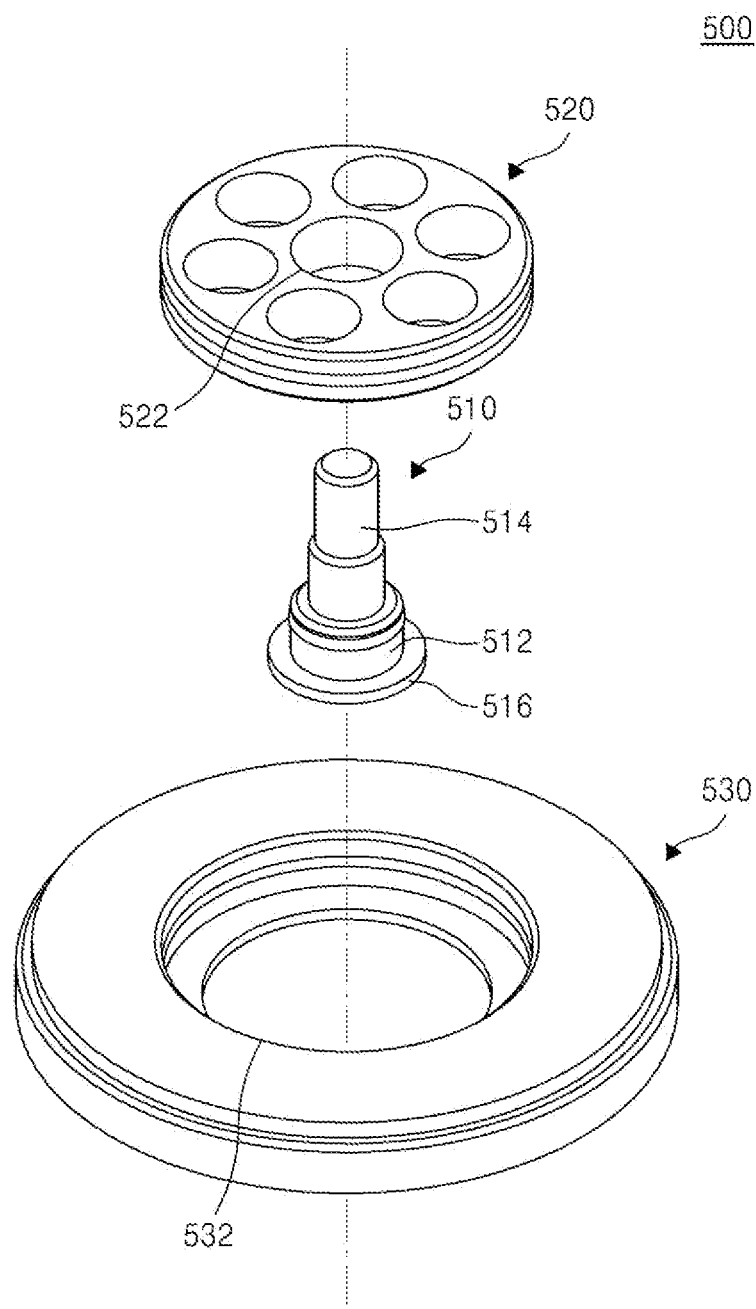

[FIG. 13]
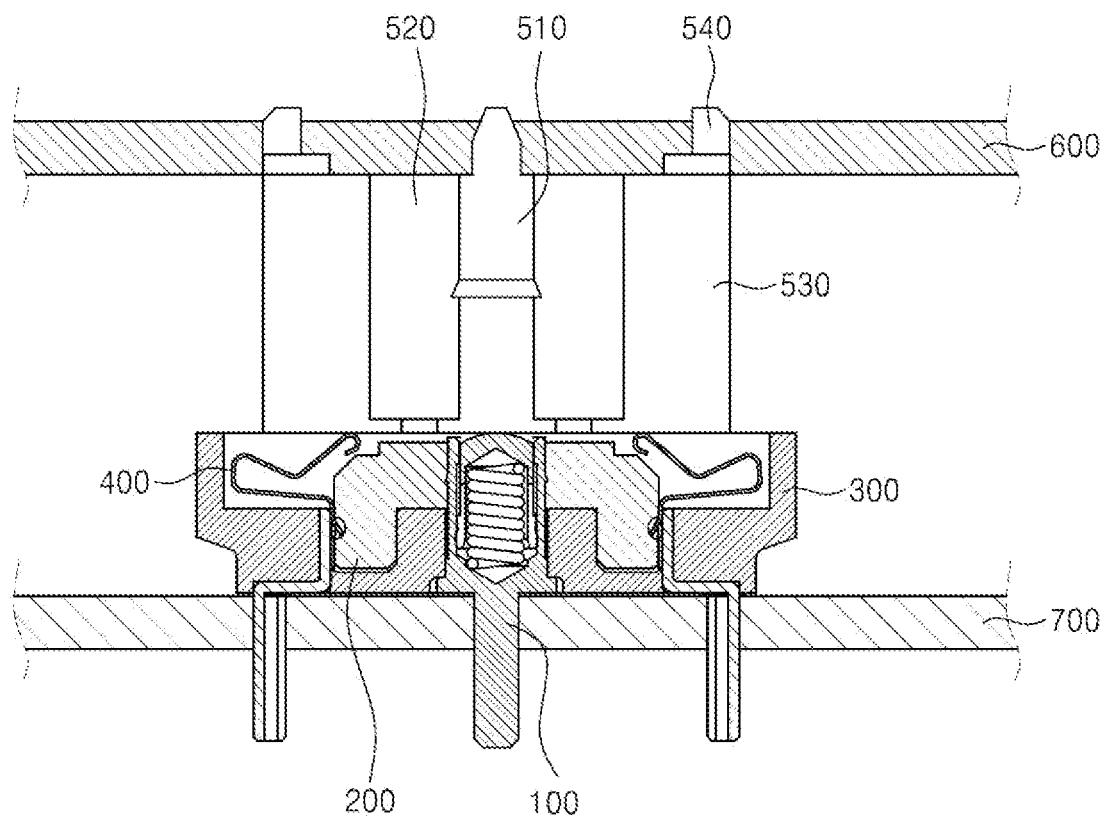

[FIG. 14A]
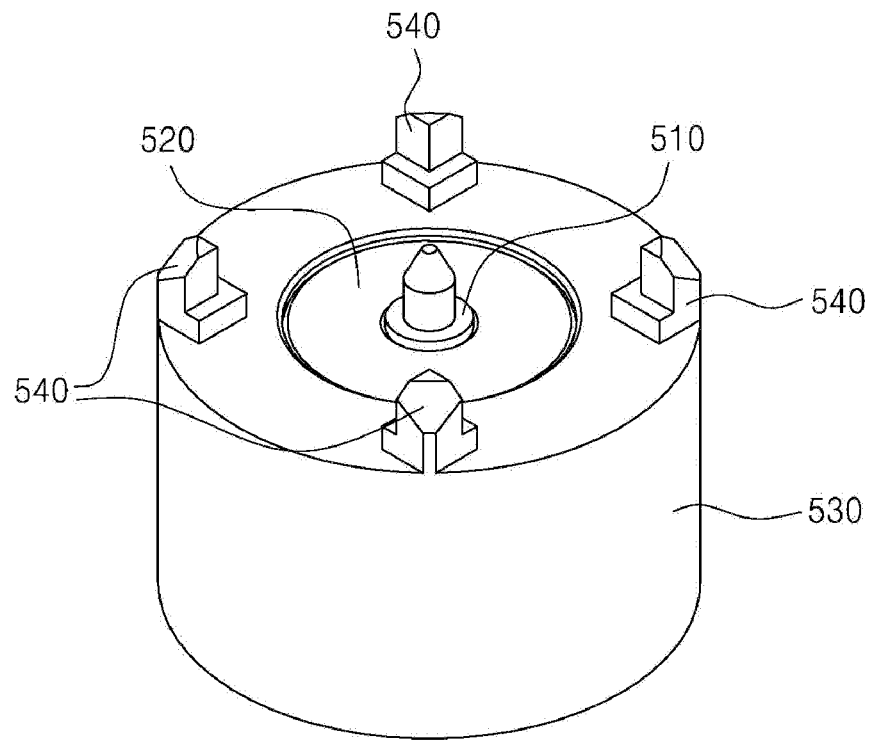
[FIG. 14B]
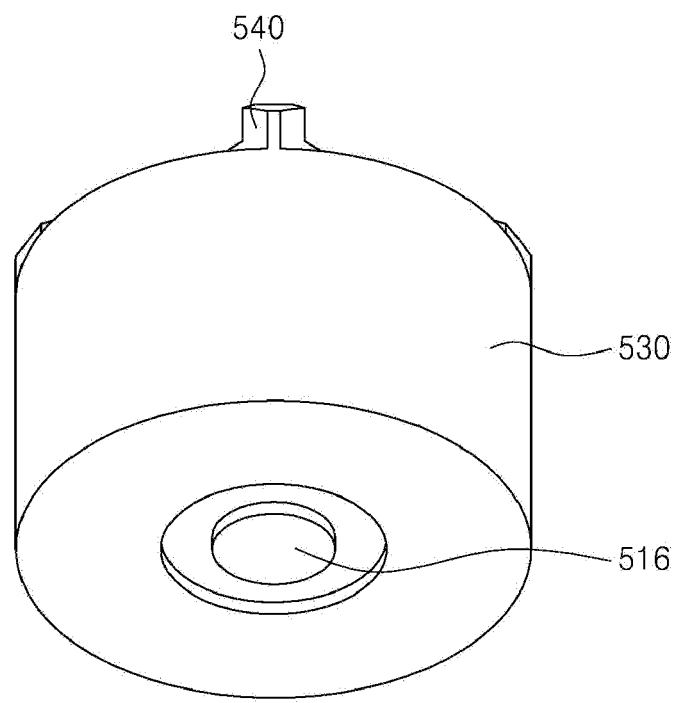

[FIG. 15]
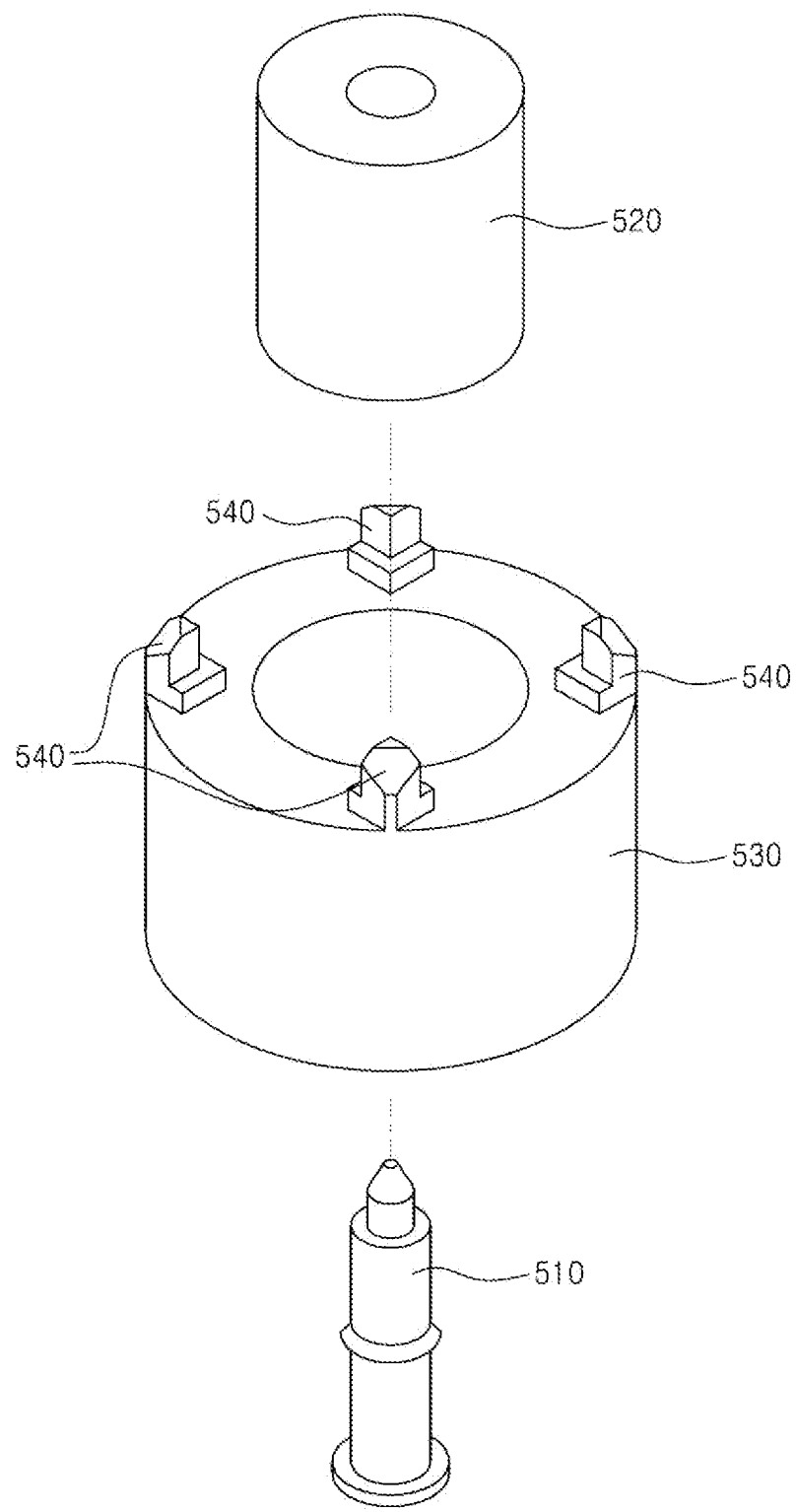

BOARD CONNECTION CONNECTOR AND BOARD CONNECTION ASSEMBLY COMPRISING SAME

CROSS-REFERENCE TO RELATED APPLICATIONS

This Application is the National Stage filing under 35 U.S.C. § 371 of PCT Application Ser. No. PCT/KR2021/019396 filed on Dec. 20, 2021, which claims the benefit of Korean Patent Application No. 10-2020-0179198 filed on Dec. 21, 2020 and Korean Patent Application No. 10-2021-0177923 filed on Dec. 13, 2021. The disclosures of the above applications are hereby incorporated herein by reference in their entireties.

TECHNICAL FIELD

The present invention relates to a board connection connector and a board connection assembly including the same.

BACKGROUND

In general, a board connection connector used in a mobile communication repeater is disposed between facing boards such as printed circuit boards (PCBs) on which signal lines are formed and used to transmit a signal between the boards. Recently, multiple-input multiple-output (MIMO) technology using a plurality of antennas has been used in order to increase data transmission capacity. As a 5G or higher communication environment and the like are developed, the number of antennas is increased, and thus, the number of board connection connectors is also increased.

As such, as the number of board connection connectors is increased, weight and costs are increased accordingly, and thus there is a need for a method for reducing the weight and costs.

In addition, there is a need for a method of minimizing a height between boards in order to miniaturize a mobile communication repeater.

Technical Problem

The present invention is directed to providing a board connection connector for reducing weight and costs and minimizing a height between boards, and a board connection assembly including the same. However, such problems are exemplary, and the scope of the present invention is not limited thereto.

Technical Solution

A board connection connector according an embodiment of the present invention includes a board connection pin configured to transmit a signal, a dielectric part having a first insertion hole into which the board connection pin is inserted, a housing having a trench into which the dielectric part is partially inserted and having a second insertion hole into which the board connection pin is inserted, and a ground contact part disposed between the housing and the dielectric part to be in contact with a ground electrode.

According to an embodiment, the ground contact part may be formed such that one side thereof is inserted into the trench to come into contact with one surface of the trench and the other side thereof is grounded to the ground electrode, and a height of the housing may be smaller than a width of the housing.

According to an embodiment, the housing may include a stepped portion adjacent to the trench.

According to an embodiment, a portion of the ground contact part may be inserted inside the stepped portion.

According to an embodiment, a plurality of legs extending downward from the housing along a side surface of the trench may be formed in the housing.

According to an embodiment, the leg may be integrated with the housing through an insert injection process.

According to an embodiment, the leg may include a first portion extending along the side surface of the trench, a second portion extending in a direction perpendicular to a longitudinal direction of the housing, and a third portion extending downward from the housing.

According to an embodiment, the ground contact part may include a ground insertion portion inserted into the trench, a ground elastic portion which extends from the ground insertion portion in a longitudinal direction and is formed by a plurality of slits recessed along a circumference of the ground insertion portion, and a ground portion which extends from the ground elastic portion in the longitudinal direction and of which one side is grounded to the ground electrode.

According to an embodiment, the ground insertion portion may be inserted into the trench such that an outer surface thereof overlaps one surface of the first portion of the leg.

According to an embodiment, the ground elastic portion may have a curved shape to be inserted inside the stepped portion.

According to an embodiment, the ground portion may have a curved shape such that one side thereof is grounded to the ground electrode.

According to an embodiment, the dielectric part may include a dielectric body which has the first insertion hole and of which a diameter increases in a direction in which the dielectric part is inserted into the trench, and a dielectric protrusion protruding from an edge of the dielectric body in a longitudinal direction.

According to an embodiment, the housing may further include a protrusion which is adjacent to the second insertion hole and protrudes upward from a lower portion of the housing, and the dielectric part may be coupled to the housing such that one surface of the dielectric protrusion is in contact with one surface of the trench and a lower surface of the dielectric body is in contact with an upper surface of the protrusion.

According to an embodiment, the ground insertion portion may include an inner surface in contact with an outer surface of the dielectric part and a fixing protrusion protruding from at least a portion of the inner surface.

According to an embodiment, the dielectric protrusion may include a fixing groove, which is formed to face the fixing protrusion, in a portion of the outer surface and to which the fixing protrusion is coupled.

According to an embodiment, the ground elastic portion may include a first elastic portion extending outward from the ground contact part in a direction perpendicular to the longitudinal direction of the ground contact part from the ground insertion portion, a second elastic portion extending from the first elastic portion in the longitudinal direction of the ground contact part, and a third elastic portion extending inward from the ground contact part in the direction perpendicular to the longitudinal direction of the ground contact part from the second elastic portion.

According to an embodiment, the length of the ground insertion portion may be smaller than the length of the ground elastic portion and the ground portion.

A board connection assembly according to an embodiment of the present invention includes an adapter connector including an adapter connection pin configured to transmit a signal, a dielectric body into which the adapter connection pin is inserted, and a ground body into which the dielectric body is inserted, a first board having an insertion hole into which the adapter connector is partially inserted, a fixing board which supports a lower surface of the first board, into which the adapter connector is inserted, and which is coupled to the adapter connector as a ground, and a board connection connector including a board connection pin configured to transmit the signal, a dielectric part into which the board connection pin is inserted, a housing into which the board connection pin and the dielectric part are inserted, and a ground contact part which is disposed between the dielectric part and the housing and is in contact with a lower surface of the ground body.

According to an embodiment, the adapter connector may include the adapter connection pin partially inserted into the first board, the dielectric body having a first opening into which the adapter connection pin is inserted, and the ground body which has a second opening into which the dielectric body is inserted and of which a first surface and a second surface opposite to each other have a flat shape.

According to an embodiment, the adapter connection pin may include a central portion disposed in the first opening of the dielectric body and a first connection portion extending upward from the central portion and protruding from the dielectric body, and a diameter of the central portion may be greater than a diameter of the first connection portion.

According to an embodiment, the adapter connection pin may further include a contact portion which has a cross-sectional area different from that of the first opening and is supported on a lower surface of the dielectric body.

According to an embodiment, the board connection connector may include the board connection pin of which one side is in contact with the contact portion, the dielectric part having a first insertion hole into which the board connection pin is inserted, the housing which has a trench into which the dielectric part is inserted and has a second insertion hole into which the board connection pin is inserted, and the ground contact part which is disposed between the housing and the dielectric part and is in contact with the lower surface of the ground body, According to an embodiment, the ground contact part may be formed such that one side thereof is inserted into the trench to come into contact with one surface of the trench and the other side thereof is grounded to the lower surface of the ground body, and a height of the housing may be smaller than a width of the housing.

According to an embodiment, a plurality of legs extending downward from the housing along a side surface of the trench may be formed in the housing.

According to an embodiment, the leg may be integrated with the housing through an insert injection process.

According to an embodiment, the leg may include a first portion extending along the side surface of the trench, a second portion extending in a direction perpendicular to a longitudinal direction of the housing, and a third portion extending downward from the housing.

According to an embodiment, the ground contact part may include a ground insertion portion inserted into the trench, a ground elastic portion which extends from the ground insertion portion in a longitudinal direction and is formed by a plurality of slits recessed along a circumference of the ground insertion portion, and a ground portion which extends from the ground elastic portion in the longitudinal direction and of which one side is grounded to the ground body.

According to an embodiment, the length of the ground insertion portion may be smaller than the length of the ground elastic portion and the ground portion.

According to an embodiment, the ground insertion portion may be inserted into the trench such that an outer surface thereof overlaps one surface of the first portion of the leg.

According to an embodiment, the adapter connector may further include a lead extending downward from the ground body.

Advantageous Effects

According to embodiments of the present invention configured as described above, a height of a board connection connector is minimized to further miniaturize the board connection connector and also minimize a height between boards, thereby miniaturizing a mobile communication repeater.

According to the present invention, a housing and a leg of a board connection connector are integrally formed of different materials, thereby reducing the weight of the board connection connector and also reducing manufacturing costs.

BRIEF DESCRIPTION OF DRAWINGS

Hereinafter, exemplary embodiments of the present invention will be described in detail with reference to the accompanying drawings, wherein like reference numbers denote like elements, but the present invention is not limited thereto.

FIG. 1 is a perspective view illustrating a board connection connector according to one embodiment of the present invention.

FIG. 2 is an assembly view illustrating the board connection connector according to one embodiment of the present invention.

FIG. 3 is a cross-sectional view illustrating the board connection connector according to one embodiment of the present invention.

FIGS. 4A and 4B shows perspective views illustrating a dielectric part according to one embodiment of the present invention.

FIG. 5 is a cross-sectional view illustrating the dielectric part according to one embodiment of the present invention.

FIG. 6 is a perspective view illustrating a housing according to one embodiment of the present invention.

FIG. 7 is a cross-sectional view illustrating the housing according to one embodiment of the present invention.

FIGS. 8A and 8B shows perspective views illustrating a ground contact part according to one embodiment of the present invention, wherein FIG. 8A is a perspective view illustrating the ground contact part based on an upper side, and FIG. 8B is a perspective view illustrating the ground contact part based on a lower side.

FIG. 9 is a cross-sectional view illustrating the ground contact part according to one embodiment of the present invention.

FIG. 10 is a cross-sectional view illustrating a board connection assembly including a board connection connector and an adapter connector according to one embodiment of the present invention.

FIGS. 11A and 11B shows perspective views illustrating the adapter connector according to one embodiment of the present invention, wherein FIG. 11A is a perspective view illustrating the adapter connector based on an upper side, and FIG. 11B is a perspective view illustrating the adapter connector based on a lower side.

FIG. 12 is an assembly view illustrating the adapter connector according to one embodiment of the present invention.

FIG. 13 is a cross-sectional view illustrating a board connection assembly including a board connection connector and an adapter connector according to another embodiment of the present invention.

FIGS. 14A and 14B shows perspective views illustrating the adapter connector according to another embodiment of the present invention, wherein FIG. 14A is a perspective view illustrating the adapter connector based on an upper side, and FIG. 14B is a perspective view illustrating the adapter connector based on a lower side.

FIG. 15 is an assembly view illustrating the adapter connector according to another embodiment of the present invention.

MODE FOR CARRYING OUT THE INVENTION

Hereinafter, embodiments of the present invention will be described in detail with reference to accompanying drawings so as to be easily implemented by those skilled in the art to which the present disclosure pertains.

It should be understood that the present invention may be embodied in various different forms and is not limited to the following embodiments.

FIG. 1 is a perspective view illustrating a board connection connector according to one embodiment of the present invention. FIG. 2 is an assembly view illustrating the board connection connector according to one embodiment of the present invention. FIG. 3 is a cross-sectional view illustrating the board connection connector according to one embodiment of the present invention.

A board connection connector 1000 according to the embodiment of the present invention may include a board connection pin 100, a dielectric part 200, a housing 300, a ground contact part 400, and legs 340.

Specifically, referring to FIGS. 1 to 3, the board connection connector 1000 includes the board connection pin 100 partially inserted into the dielectric part 200 to transmit a signal, the dielectric part 200 which is partially inserted into the housing 300 and has a first insertion hole 210 into which the board connection pin 100 is inserted, the housing 300 into which the dielectric part 200 is partially inserted and which has a second insertion hole 320 into which the board connection pin 100 is inserted, and the ground contact part 400 which is disposed between the housing 300 and the dielectric part 200 and grounded in contact with a ground electrode. In this case, the ground electrode may be an electrode of a metal thin film printed on a board or a lower surface of a ground body 530 of an adapter connector 500 that will be described below.

In particular, the board connection connector 1000 may have an approximately cylindrical shape and may have a structure in which the ground contact part 400 having a cylindrical shape is inserted into the housing 300, and in a state in which the ground contact part 400 is inserted, the dielectric part 200 and the board connection pin 100 are inserted.

In addition, a height of the housing 300 of the board connection connector 1000 may be smaller than a width of the housing 300. Thus, a separation distance between boards connected through the board connection connector 1000 can be reduced, thereby miniaturizing a mobile communication repeater.

One side of the board connection pin 100 may be in contact with a signal electrode, and the other side thereof may be in contact with the board or may be partially inserted into the board to be electrically connected to a signal line of the board. In this case, the signal electrode may be an electrode of a metal thin film printed on the board or a contact portion 516 of the adapter connector 500 that will be described below.

The board connection pin 100 may be a pogo pin operated through a spring inserted therein. The present invention is not limited thereto, and the board connection pin 100 may be any one of various components having elasticity.

The board connection pin 100 may be inserted into the first insertion hole 210 of the dielectric part 200 and the second insertion hole 320 of the housing 300 which will be described below, and a portion of an outer circumferential surface of the board connection pin 100 may have a diameter that is greater than the second insertion hole 320 so that a portion of the board connection pin 100 inserted into the second insertion hole 320 may be limited.

The board connection pin 100 may be formed of a metal material having electrical conductivity and may include, for example, at least one selected from among copper, copper, and beryllium copper, but the present invention is not limited thereto.

The dielectric part 200 may be formed of a non-conductive material having permittivity, may have an approximately cylindrical shape, and may have the first insertion hole 210 into which the board connection pin 100 is partially inserted. For example, the board connection pin 100 may be inserted into the first insertion hole 210 and coupled to the dielectric part 200. Hereinafter, the dielectric part 200 will be described in detail with further reference to FIGS. 4 and 5.

FIGS. 4A and 4B shows perspective views illustrating the dielectric part according to one embodiment of the present invention. FIG. 5 is a cross-sectional view illustrating the dielectric part according to one embodiment of the present invention.

Specifically, referring to FIGS. 3 to 5, the dielectric part 200 may include a dielectric body 220 which has the first insertion hole 210 and of which a diameter increases in a direction in which the dielectric part 200 is inserted into a trench 310 of the housing 300 and a dielectric protrusion 230 protruding from an edge of the dielectric body 220 in a longitudinal direction (that is, the direction in which the dielectric part 200 is inserted into the housing 300).

When the dielectric protrusion 230 is inserted into the trench 310, the first insertion hole 210 of the dielectric part 200 and the second insertion hole 320 of the housing 300 may be disposed to pass through the housing 300 in a longitudinal direction of the housing 300, and thus the board connection pin 100 may be inserted therein.

The dielectric protrusion 230 may protrude to a length that can be inserted into the trench 310 of the housing 300 to be described below. Accordingly, the dielectric part 200 and the housing 300 may be coupled such that one surface of the dielectric protrusion 230 is in contact with one surface of the trench 310, and a lower surface 222 of the dielectric body 220 is in contact with an upper surface of a protrusion 350 of the housing 300 that will be described below. Through the coupling, a height of the board connection connector can be reduced to miniaturize the board connection connector and reduce the separation distance between the boards, thereby reducing a size of the mobile communication repeater.

A fixing groove 232 may be formed along a circumference of an outer surface of the dielectric protrusion 230 to face fixing protrusions 412 of the ground contact part 400 that will be described below. Accordingly, when the dielectric protrusion 230 is inserted in the trench 310 of the housing 300 in a state in which a ground insertion portion 410 of the ground contact part 400 that will be described below is inserted, the fixing groove 232 may be coupled to the fixing protrusions 412 so that the dielectric part 200 and the ground contact part 400 may be fixed to each other. Thus, the dielectric protrusion 230 and the ground insertion portion 410 may be tightly coupled to each other.

The fixing groove 232 may be formed in a shape in which a groove surrounds the outer surface of the dielectric protrusion 230 (see FIG. 4), or a plurality of grooves may be formed along the outer surface of the dielectric protrusion 230 at positions corresponding to the fixing protrusions 412.

The dielectric part 200 may have an approximately cylindrical shape and may be formed of an insulating material having an electrical insulating property.

The housing 300 may have the trench 310 into which the dielectric part 200 is partially inserted and the second insertion hole 320 into which the board connection pin 100 is inserted. Hereinafter, the housing will be described in detail with further reference to FIGS. 6 and 7.

FIG. 6 is a perspective view illustrating the housing according to the embodiment of the present invention. FIG. 7 is a cross-sectional view illustrating the housing according to one embodiment of the present invention.

Specifically, referring to FIGS. 3, 6, and 7, the trench 310 of the housing 300 may have a structure recessed to a length into which the dielectric protrusion 230 can be completely inserted. Due to such a structure, the dielectric protrusion 230 may be inserted into the trench 310, and the ground insertion portion 410 that will be described below may be inserted between a side surface of the trench 310 and a side surface of the dielectric protrusion 230. Thus, the housing 300, the dielectric part 200, and the ground contact part 400 may be tightly coupled to each other.

The housing 300 may further include a stepped portion 330 formed adjacent to the trench 310. The stepped portion 330 may have a space into which the ground contact part 400 can be partially inserted. Specifically, ground elastic portions 420 of the ground contact part 400 that will be described below may be positioned in the space of the stepped portion 330. As a result, since a space in which the ground elastic portion 420 operates is secured through the stepped portion 330, one side of the ground contact part 400 may be easily grounded when grounded to the ground electrode.

The plurality of legs 340 may be formed in the housing 300 to extend downward from the housing 300.

The leg 340 may include the first portion 342 of which one surface vertically extends along the side surface of the trench 310, a second portion 344 which extends from the first portion 342 in a direction perpendicular to the longitudinal direction of the housing 300, and a third portion 346 which vertically extends from the second portion 344 downward from the housing 300. In particular, when the ground contact part 400 is partially inserted into the trench 310, one surface of the first portion 342 may be in contact with one surface of the ground insertion portion 410 that will be described below. Thus, the ground contact part 400 and the leg 340 may be grounded.

The second portion 344 may extend in the direction perpendicular to the longitudinal direction of the housing 300, and the first portion 342 and the third portion 346 may vertically extend in different directions from both ends thereof so that the housing 300 and the leg 340 may be tightly coupled to each other.

The leg 340 may be formed of a metal material, and the housing 300 may be formed of an injection-moldable thermoplastic material (for example, a plastic material) so that the leg 340 and the housing 300 may be formed to be integrated through an insert injection process. As described above, since the housing is formed of a thermoplastic material instead of a metal material, the weight and manufacturing costs of the housing can be reduced.

The housing 300 may further include the protrusion 350 which is adjacent to the second insertion hole 320 and protrudes upward from a lower portion of the housing 300. When the dielectric part 200 is coupled to the housing 300, one surface of the dielectric protrusion 230 may be in contact with one surface of the trench 310, and the lower surface of the dielectric body 220 may be in contact with the upper surface of the protrusion 350. Thus, the height of the board connection connector can be reduced to reduce the separation distance between the boards, thereby miniaturizing the mobile communication repeater.

The ground contact part 400 may have a cylindrical shape and may be formed such that one side thereof is inserted into the trench 310 to be in contact with one surface of the trench 310, and the other side thereof is grounded to the ground electrode.

Specifically, the ground contact part 400 may include the ground insertion portion 410, the ground elastic portions 420, and ground portions 430.

The ground contact part 400 may be manufactured by plastically deforming a metal plate formed of a conductive material. The ground contact part 400 may be in partial contact with the leg 340 positioned on the side surface of the trench 310 so that the ground contact part 400 and the leg 340 may be grounded. In addition, a portion of the ground contact part 400 may be in elastic contact with the ground electrode to always maintain an electrode contact state of a predetermined level or more.

Hereinafter, the ground contact part 400 will be described in detail with further reference to FIGS. 8 and 9.

FIGS. 8A and 8B shows perspective views illustrating the ground contact part according to one embodiment of the present invention. In this case, FIG. 8A is a perspective view illustrating the ground contact part based on an upper side, and FIG. 8B is a perspective view illustrating the ground contact part based on a lower side. In addition, FIG. 9 is a cross-sectional view illustrating the ground contact part according to one embodiment of the present invention.

Referring to FIGS. 8 and 9, the ground contact part 400 may have a rolled-up structure and may be formed such that facing ends thereof are spaced apart from each other. In particular, when the ground insertion portion 410 of the ground contact part 400 is inserted into the trench 310 of the housing 300, the ground insertion portion 410 is smoothly inserted into the trench 310 as the facing ends are brought into close contact. After the ground insertion portion 410 is inserted into the trench 310, an outer circumferential surface of the ground insertion portion 410 comes into close contact with the side surface of the trench 310 as the facing ends are spread from each other, thereby preventing the ground contact part 400 from being separated from the dielectric part 200.

The ground insertion portion 410 may be inserted into the trench 310 of the housing 300 such that an outer surface thereof is in contact with the side surface of the trench 310. Since the first portion 342 of the leg 340 may be positioned on the side surface of the trench 310, a portion of the outer surface of the ground insertion portion 410 may come into contact with one surface of the first portion 342 of the leg 340. In other words, the ground insertion portion 410 may be inserted into the trench 310 such that the outer surface thereof overlaps the side surface of the trench 310 and one surface (that is, a side surface) of the first portion 342 of the leg 340 positioned on the side surface of the trench 310. Thus, the ground insertion portion 410 and the leg 340 may be electrically connected.

In a state in which the ground insertion portion 410 is inserted into the trench 310, the dielectric protrusion 230 may be inserted into the trench 310 such that an inner surface of the ground insertion portion 410 comes into contact with an outer surface of the dielectric protrusion 230.

The ground insertion portion 410 may include fixing protrusions 412 protruding from at least portions of an inner surface thereof, and when the dielectric protrusion 230 is inserted into the trench 310, the fixing protrusions 412 may be coupled to the fixing groove 232 of the dielectric protrusion 230 so that the ground contact part 400 and the dielectric part 300 may be fixed to each other. Thus, the dielectric part 200 and the ground contact part 400 may be tightly coupled to each other.

A plurality of slits 414 may be recessed and formed along a circumference of the ground insertion portion 410, and the ground elastic portions 420 and the ground portions 430 may be formed between the plurality of slits 414, wherein the ground elastic portions 420 extend in a longitudinal direction of the ground contact part 400, and the ground portions 430 extend from the ground elastic portions 420 and have a curved shape such that one side (that is, an end) thereof is grounded to the ground electrode. Thus, the ground portion 430 may have high contact power and may be in stable contact with the ground electrode, and since a height of the ground contact part is reduced due to such a structure, the separation distance between the boards can be reduced, thereby miniaturizing the mobile communication repeater.

When the ground insertion portion 410 is inserted into the trench 310, the ground elastic portion 420 may be positioned in the space formed by the stepped portion 330 of the housing 300. The ground elastic portion 420 may have a curved shape to be inserted inside the stepped portion 330. Thus, the ground contact part easily comes into contact with the ground electrode.

The ground elastic portion 420 may include a first elastic portion 422, a second elastic portion 424, and a third elastic portion 426.

The first elastic portion 422 may extend outward from the ground contact part 400 in a direction perpendicular to the longitudinal direction of the ground contact part 400 from the ground insertion portion 410.

The second elastic portion 424 may extend from the first elastic portion 422 in the longitudinal direction of the ground contact part 400.

The third elastic portion 426 may extend inward from the ground contact part 400 in the direction perpendicular to the longitudinal direction of the ground contact part 400 from the second elastic portion 424.

As described above, the separation distance between the boards can be reduced due to a shape of each of the first, second, and third elastic portions 422, 424, and 426, thereby miniaturizing the mobile communication repeater.

Bent portions may be provided between the ground insertion portion 410 and the first elastic portion 422, between the first elastic portion 422 and the second elastic portion 424, between the second elastic portion 424 and the third elastic portion 426, and between the third elastic portion 426 and the ground portion 430. Due to such bent portions, contact pressure applied when an end of the ground portion 430 comes into contact with the ground electrode is dispersed, thereby preventing the ground contact part 400 from being deformed or damaged.

In addition, due to such a shape of the ground contact part 400 as described above, when the end of the ground portion 430 comes into contact with the ground electrode, the ground portion 430 is bent by an elastic force, and thus the end of the ground portion 430 is in uniform contact with the ground electrode, thereby also uniformly maintaining a current flow.

Furthermore, the length of the ground insertion portion 410 may be smaller than the length of the ground elastic portion 420 and the ground portion 430. Thus, the height of the board connection connector can be reduced, thereby miniaturizing the mobile communication repeater.

Hereinafter, a board connection assembly including a board connection connector and an adapter connector for transmitting a signal between boards will be described with reference to FIGS. 10 to 12.

FIG. 10 is a cross-sectional view illustrating a board connection assembly including a board connection connector and an adapter connector according to one embodiment of the present invention.

Referring to FIG. 10, a board connection assembly 800 may include an adapter connector 500, a first board 600, a second board 700, and a board connection connector 1000. Hereinafter, the adapter connector will be described in detail with reference to FIGS. 10 to 12.

FIGS. 11A and 11B shows perspective views illustrating the adapter connector according to one embodiment of the present invention. In this case, FIG. 11A is a perspective view illustrating the adapter connector based on an upper side, and FIG. 11B is a perspective view illustrating the adapter connector based on a lower side.

FIG. 12 is an assembly view illustrating the adapter connector according to one embodiment of the present invention.

Referring to FIGS. 10 to 12, the adapter connector 500 may include an adapter connection pin 510 which transmits a signal, a dielectric body 520 into which the adapter connection pin 510 is inserted, and a ground body 530 into which the dielectric body 520 is inserted and which is grounded.

The adapter connection pin 510 may be formed of a conductive material, may be partially inserted into the first board 600 that will be described below, and may include a central portion 512 and a connection portion 514.

Specifically, the central portion 512 may be disposed in a first opening 522 of the dielectric body 520, and the connection portion 514 may extend upward from the central portion 512 and may protrude from the dielectric body 520. Here, a diameter of the central portion 512 may be greater than a diameter of the connection portion 514.

The connection portion 514 may be inserted into an insertion hole formed in the first board 600 that will be described below and may be disposed to protrude from the first board 600. For example, a portion of the connection portion 514 may be exposed to the outside of the first board 600.

Moreover, the adapter connection pin 510 may further include a contact portion 516, and the contact portion 516 may have a cross-sectional area different from that of the first opening 522 and may be supported on a lower surface of the dielectric body 520.

The dielectric body 520 is formed of a non-conductive material having permittivity and may have the first opening 522 into which the adapter connection pin 510 is inserted.

The ground body 530 may be formed of a conductive material and may have a second opening 532 into which the dielectric body 520 is inserted, and a first surface and a second surface thereof opposite to each other may have a flat shape.

The first board 600 may include a signal line electrically connected to the adapter connector 500 and may have the insertion hole into which the adapter connector 500 is partially inserted. For example, the first board 600 may be a printed circuit board (PCB) or a flexible printed circuit board (FPCB). In addition, the signal line may be a line formed of a metal thin film printed on the first board 600.

A fixing board 650 may support a lower surface of the first board 600, and the adapter connector 500 may be inserted therein. In particular, the fixing board 650 may fix a position at which the adapter connector 500 is disposed such that a portion of the adapter connector 500 is accurately inserted into the insertion hole of the first board 600, and the board connection connector 1000 that will be described below is in accurate contact with the contact portion 516. The fixing board 650 may be formed of an insulating material having an electrical insulating property or a metal material. In addition, the fixing board 650 may be a ground for shielding external signal interference on the adapter connection pin 510. The fixing board 650 may be grounded to the outside to be grounded to the adapter connector 500.

The second board 700 has a plurality of insertion holes into which legs 340 and a board connection pin 100 of the board connection connector 1000 that will be described below are partially inserted.

The board connection connector 1000 may include the board connection pin 100 which transmits a signal, a dielectric part 200 into which the board connection pin 100 is inserted, a housing 300 into which the board connection pin 100 and the dielectric part 200 are inserted, and a ground contact part 400 which is disposed between the dielectric part 200 and the housing 300 and is in contact with a lower surface of the ground body 530.

In particular, when the board connection connector 1000 is inserted into the second board 700, one side of the board connection pin 100 is in contact with the contact portion 516 of the adapter connector 500 inserted into the first board 600, and an end of the ground contact part 400 comes into contact with the lower surface of the ground body 530, thereby signal transmission between boards can be easily performed. In addition, due to the structure of the board connection connector 1000 described above, a separation distance between the boards can be reduced, thereby miniaturizing a mobile communication repeater. In addition, since the adapter connector 500 can substitute for an electrode with which the board connection connector 1000 is in contact and a line for the contact formed on a lower surface of the first board 600, a structure of the first board can be simplified.

Hereinafter, another embodiment of an adapter connector will be described in detail with reference to FIGS. 13 to 15.

FIG. 13 is a cross-sectional view illustrating a board connection assembly including a board connection connector and an adapter connector according to another embodiment of the present invention.

FIGS. 14A and 14B shows perspective views illustrating the adapter connector according to another embodiment of the present invention. In this case, FIG. 14A is a perspective view illustrating the adapter connector based on an upper side, and FIG. 14B is a perspective view illustrating the adapter connector based on a lower side.

FIG. 15 is an assembly view illustrating the adapter connector according to another embodiment of the present invention.

Referring to FIGS. 13 to 15, an adapter connector 500 may include an adapter connection pin 510 which transmits a signal, a dielectric body 520 into which the adapter connection pin 510 is inserted, a ground body 530 into which the dielectric body 520 is inserted and which is grounded, and a plurality of leads 540 extending in a longitudinal direction from an edge portion of the ground body 530.

The adapter connection pin 510, the dielectric body 520, and the ground body 530, which are the components of the adapter connector according to another embodiment, are the same as the components of the adapter connector according to one embodiment except that there is a height difference from the adapter connector according to one embodiment, and thus detailed descriptions thereof will be omitted.

The lead 540 may be formed of a conductive material extending from the ground body 530 and may be inserted into an insertion hole formed in a first board 600. In particular, the lead 540 may be grounded to a ground of the first board 700 to improve shielding of the adapter connector 500 and improve coupling with the first board 600.

Although the present invention has been described in detail through exemplary embodiments, the present invention is not limited thereto and may be variously implemented within the scope of the claims.

The invention claimed is:

1. A board connection connector, comprising:
   a board connection pin configured to transmit a signal;
   a dielectric part comprising a first insertion hole into which the board connection pin is inserted;
   a housing comprising a trench into which the dielectric part is partially inserted, a stepped portion disposed around the periphery of the trench, a protrusion disposed to protrude inside the trench, and a second insertion hole provided in the protrusion into which the board connection pin is inserted; and
   a ground contact part disposed between the housing and the dielectric part to be in contact with a ground electrode,
   wherein:
   the ground contact part is formed such that a portion thereof is inserted into the trench and the other portion thereof is grounded to the ground electrode,
   a portion of the ground contact part is inserted inside the stepped portion,
   the dielectric part includes:
     a dielectric body comprising the first insertion hole; and
     a dielectric protrusion protruding from an edge portion of the dielectric body in a longitudinal direction,
   the dielectric protrusion is inserted into the trench such that a lower surface of the dielectric body contacts an upper surface of the protrusion, and
   a height of the housing is smaller than a width of the housing.

2. The board connection connector of claim 1, wherein a plurality of legs extending downward from the housing along a side surface of the trench are formed in the housing.

3. The board connection connector of claim 2, wherein the leg is integrated with the housing through an insert injection process.

4. The board connection connector of claim 2, wherein the leg includes:
a first portion extending along the side surface of the trench;
a second portion extending in a direction perpendicular to a longitudinal direction of the housing; and
a third portion extending downward from the housing.

5. The board connection connector of claim 4, wherein the ground contact part includes:
a ground insertion portion inserted into the trench;
a ground elastic portion which extends from the ground insertion portion in a longitudinal direction and is formed by a plurality of slits recessed along a circumference of the ground insertion portion; and
a ground portion which extends from the ground elastic portion in the longitudinal direction and of which one side is grounded to the ground electrode.

6. The board connection connector of claim 5, wherein the ground insertion portion is inserted into the trench such that an outer surface thereof overlaps one surface of the first portion of the leg.

7. The board connection connector of claim 5, wherein the ground elastic portion has a curved shape to be inserted inside the stepped portion.

8. The board connection connector of claim 5, wherein the ground portion has a curved shape such that one side thereof is grounded to the ground electrode.

9. The board connection connector of claim 5, wherein:
the ground insertion portion includes an inner surface in contact with an outer surface of the dielectric part and a fixing protrusion protruding from at least a portion of the inner surface; and
the dielectric protrusion includes a fixing groove which is formed to face the fixing protrusion in a portion of the outer surface and to which the fixing protrusion is coupled.

10. The board connection connector of claim 5, wherein the ground elastic portion includes:
a first elastic portion extending outward from the ground contact part in a direction perpendicular to the longitudinal direction of the ground contact part from the ground insertion portion;
a second elastic portion extending from the first elastic portion in the longitudinal direction of the ground contact part; and
a third elastic portion extending inward from the ground contact part in the direction perpendicular to the longitudinal direction of the ground contact part from the second elastic portion.

11. The board connection connector of claim 5, wherein a length of the ground insertion portion is smaller than a length of the ground elastic portion and the ground portion.

12. A board connection assembly, comprising:
an adapter connector including an adapter connection pin configured to transmit a signal, a dielectric body into which the adapter connection pin is inserted, and a ground body into which the dielectric body is inserted; and
a board connection connector including a board connection pin configured to transmit the signal, a dielectric part comprising a first insertion hole into which the board connection pin is inserted, a housing into which the board connection pin and the dielectric part are inserted, and a ground contact part which is disposed between the dielectric part and the housing and is in contact with a lower surface of the ground body,
wherein:
the housing includes a trench into which a portion of the dielectric part is inserted, a stepped portion disposed around the periphery of the trench, a protrusion disposed to protrude inside the trench, and a second insertion hole provided in the protrusion into which the board connection pin is inserted,
the ground contact part is formed such that a portion thereof is inserted into the trench and the other portion thereof is grounded to the ground body,
a portion of the ground contact part is inserted inside the stepped portion,
the dielectric part includes a dielectric body comprising the first insertion hole and a dielectric protrusion protruding from an edge portion of the dielectric body in a longitudinal direction,
the dielectric protrusion is inserted into the trench such that a lower surface of the dielectric body contacts an upper surface of the protrusion.

13. The board connection assembly of claim 12, wherein:
the adapter connector includes the adapter connection pin partially inserted into a first board, the dielectric body having a first opening into which the adapter connection pin is inserted, and the ground body which comprises a second opening into which the dielectric body is inserted and of which a first surface and a second surface opposite to each other have a flat shape;
the adapter connection pin includes a central portion disposed in the first opening of the dielectric body and a first connection portion extending upward from the central portion and protruding from the dielectric body; and
a diameter of the central portion is greater than a diameter of the first connection portion.

14. The board connection assembly of claim 13, wherein the adapter connection pin further includes a contact portion which comprises a cross-sectional area different from that of the first opening and is supported on a lower surface of the dielectric body.

15. The board connection assembly of claim 14, wherein a height of the housing is smaller than a width of the housing.

16. The board connection assembly of claim 12, wherein the adapter connector further includes a plurality of leads extending downward from the ground body in a longitudinal direction of the ground body.

* * * * *